United States Patent

Sommer et al.

[11] Patent Number: 5,501,317
[45] Date of Patent: Mar. 26, 1996

[54] APPARATUS FOR RECEIVING AND ADVANCING CONTAINER LIDS OF FERROMAGNETIC MATERIAL

[75] Inventors: Walter Sommer; Wilhelm Lange, both of Essen; Klaus-Peter Dirks, Moers, all of Germany

[73] Assignee: Krupp Maschinentechnik Gesellschaft mit beschränkter Haftung, Essen, Germany

[21] Appl. No.: 240,105

[22] Filed: May 9, 1994

[30] Foreign Application Priority Data

May 7, 1993 [DE] Germany .............. 43 15 307.0

[51] Int. Cl.⁶ ............................................. B65G 35/00
[52] U.S. Cl. ............................ 198/464.2; 198/619
[58] Field of Search ........................ 198/619, 381, 198/464.2

[56] References Cited

U.S. PATENT DOCUMENTS

| | | |
|---|---|---|
| 3,417,853 | 12/1968 | Mojden et al. . |
| 3,983,992 | 10/1976 | Gray et al. .............. 198/381 |
| 4,013,162 | 3/1977 | Boer . |
| 4,077,524 | 3/1978 | Rysti . |
| 4,113,142 | 9/1978 | Ryzhov et al. .............. 198/619 X |
| 4,342,404 | 8/1982 | Baker . |
| 4,391,560 | 7/1983 | Fardin . |
| 4,623,057 | 11/1986 | Langenberg .............. 198/381 |
| 5,158,169 | 10/1992 | Hardman . |
| 5,186,593 | 2/1993 | Tsukada et al. . |

FOREIGN PATENT DOCUMENTS

| | | |
|---|---|---|
| 0331967 | 9/1989 | European Pat. Off. . |
| 0552752 | 7/1993 | European Pat. Off. . |
| 2232394 | 4/1975 | Germany . |
| 3411902 | 10/1985 | Germany . |
| 2937496 | 11/1988 | Germany . |
| 4038841 | 6/1991 | Germany . |
| 4013687 | 10/1991 | Germany . |
| 4121978 | 2/1992 | Germany . |
| 8717991 | 4/1992 | Germany . |
| 4135515 | 6/1992 | Germany . |
| 644325 | 7/1984 | Switzerland . |
| 0787293 | 12/1980 | U.S.S.R. .............. 198/619 |
| 82/01842 | 6/1982 | WIPO . |

OTHER PUBLICATIONS

Miller, "Ways to Change Direction of Conveyed Materials" Automation, Sep. 1965, pp. 102–112; Sep. 1965.

Primary Examiner—D. Glenn Dayoan
Attorney, Agent, or Firm—Spencer & Frank

[57] ABSTRACT

An apparatus for receiving ferromagnetic container lids from a first processing unit and for advancing the lids to a second processing unit includes a storage track having first and second magnet assemblies extending parallel to the length dimension of the storage track. The magnet assemblies have a clearance from one another corresponding to an expected outer diameter of the lids for accommodating the lids in the clearance in an orientation in which the lid plane is perpendicular to the length dimension of the storage track. The lids are adapted to be suspended in the clearance by magnetic forces generated by the first and second magnet assemblies. First and second abutments are provided at opposite ends of the storage track and can be abutted by outermost lids suspended in the clearance. A supply conveyor extends to the storage track for introducing the lids in a vertical direction into the storage track; and a removal conveyor extends from the storage track for removing a lid therefrom. The lids in suspension in the clearance assume a spaced relationship relative to one another by mutual repulsion.

13 Claims, 4 Drawing Sheets

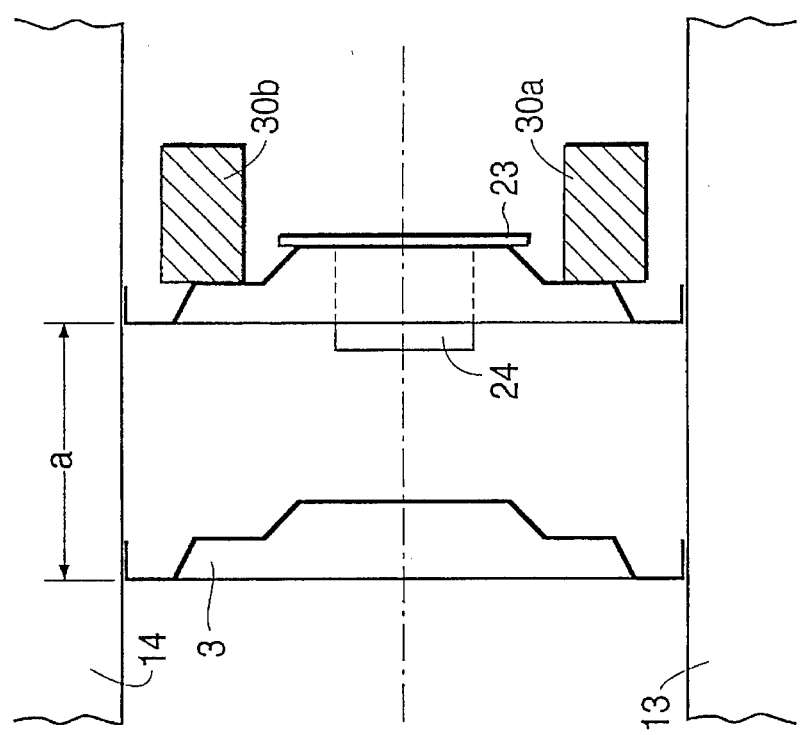
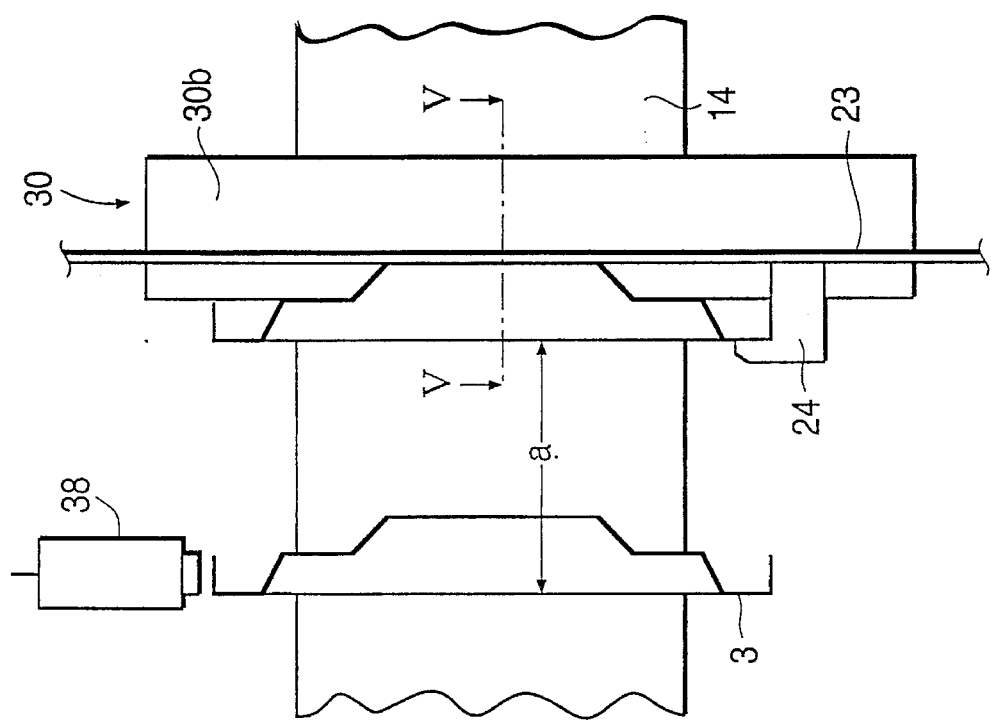

APPARATUS FOR RECEIVING AND ADVANCING CONTAINER LIDS OF FERROMAGNETIC MATERIAL

CROSS REFERENCE TO RELATED APPLICATION

This application claims the priority of German Application No. P 43 15 307.0 filed May 7, 1993, which is incorporated herein by reference.

BACKGROUND OF THE INVENTION

This invention relates to an apparatus for receiving container lids of ferromagnetic material from a first processing unit and feeding them to a second processing unit. In the present context "container lids" include circular blanks constituting products of the first manufacturing step in the lid making.

Lids punched by a press are usually provided with a "tilted" edge. They are advanced to a starting roller for further processing.

During pressing with only two lid tools, each lid is sent through a separate guide channel ("guide track") where the lid is turned by 90° in its plane and forwarded to a disk roller. The lid may enter the disk roller at any time and thus no timing problems occur.

During pressing with more than two tools, such as multi-die presses or multi-presses—during each press stroke a plurality of lids are handled. Although it is possible to associate with each lid tool its own disk roller, this would result in a very large unit.

Moreover, lid rollers of current design having a multi-station machine head rotating about a vertical axis meet higher quality requirements with respect to rolling the lids, and they are capable of rolling the large quantity of lids which are discharged from a multi press per unit of time. These machines, however, are able to accept lids only at regular intervals.

SUMMARY OF THE INVENTION

It is an object of the invention to provide an improved apparatus of the above-outlined type which makes it possible to feed a plurality of lids per unit of time at regular intervals to a processing unit.

This object and others to become apparent as the specification progresses, are accomplished by the invention, according to which, briefly stated, the apparatus for receiving ferromagnetic container lids from a first processing unit and for advancing the lids to a second processing unit includes a storage track having first and second magnet assemblies extending parallel to the length dimension of the storage track. The magnet assemblies have a clearance from one another corresponding to an expected outer diameter of the lids for accommodating the lids in the clearance in an orientation in which the lid plane is perpendicular to the length dimension of the storage track. The lids are adapted to be suspended in the clearance by magnetic forces generated by the first and second magnet assemblies. First and second abutments are provided at opposite ends of the storage track and can be abutted by outermost lids suspended in the clearance. A supply conveyor extends to the storage track for introducing the lids in a vertical direction into the storage track; and a removal conveyor extends from the storage track for removing a lid therefrom. The lids in suspension in the clearance assume a spaced relationship relative to one another by mutual repulsion.

The storage track is capable of receiving a lid stream (lids per unit of time) independently of the output capacity (lids per unit of time) of the further processing unit. Due to the magnetic force of the magnet assemblies, the lids may be maintained in a state of suspension in which the lids are at approximately the same distance from one another. In such an arrangement, the smallest distance (clearance) between the magnetic assemblies is as close as possible to the outer diameter of the lids, but a play is provided such that the lids may be moved without friction and force through the storage track. The lids are inserted vertically into the storage track by means of a supply conveyor such that the lids automatically drop between two suspended lids by virtue of the magnetic forces. The abutments at the ends of the storage track allow a calculable lid thickness (distance/lid) in the storage space for a predetermined quantity of lids and thus make possible an accurate removal of each lid. The apparatus has a removal conveyor for removing the lids from the storage track and for feeding the lids to the further processing unit.

The magnetic assemblies are arranged essentially horizontally; that is, they extend preferably in a horizontal direction, while, as an alternative, they may be gently inclined.

In order to operate the storage track with the most favorable force field, the magnet assemblies comprise U-shaped magnets which are open toward the vertical plane of symmetry. These magnets comprise a series of magnets, particularly permanent magnets, which are separated from one another by means of a strip of antimagnetic material, and are, at their rear face, connected to one another by a yoke plate. Magnets which are arranged in mirror image to the vertical plane of symmetry and are in a superposed relationship, have opposite polarities.

In order to generate the required magnetic force even for large and heavy lids, each magnet series may preferably be configured as a double row having two adjoining magnets seen in the transverse direction.

To ensure that the lids pass through the storage track as force and friction-free as possible, the magnetic assemblies are covered—at least on their side facing the vertical plane of symmetry—with an antimagnetic sheet metal which has a smooth, low-friction surface. In such an arrangement the smallest distance (clearance) for the passage of the lids pertains to the metal sheets.

To ensure that the lids are grasped accurately for removal from the storage track, the abutment at the downstream end of the storage track is fixed.

If the quantity of lids changes within the storage track, the mutual distance of the lids changes correspondingly. In order to keep this distance within predeterminable limits, the abutment at the upstream end of the storage track is adjustable so as to vary the effective length of the storage track. Advantageously, this abutment is moved by means of a linear drive, which is controllable by switches that count the number of the lids entering and leaving the storage track. As an alternative, the distance between the two last downstream lids in the storage track may be used as a reference to control the linear drive.

For the accurate removal of the lids from the storage track, the removal conveyor for removing the lids is an endless belt provided with hook-shaped carriers and running vertically between the magnet assemblies.

Although synchronous feeding of the lids into the further processing unit can be accomplished in different ways, according to an advantageous further feature of the invention the drive of the device for removing the lids from the storage path is connected by means of a gearing with the drive of the further processing unit.

BRIEF DESCRIPTION OF THE DRAWING

FIG. 4 is an enlarged side elevational view of some of the components of the structure of FIGS. 1 and 2.

FIG. 5 is a sectional view taken along line V—V of FIG. 4.

DESCRIPTION OF THE PREFERRED EMBODIMENT

Figure 1:
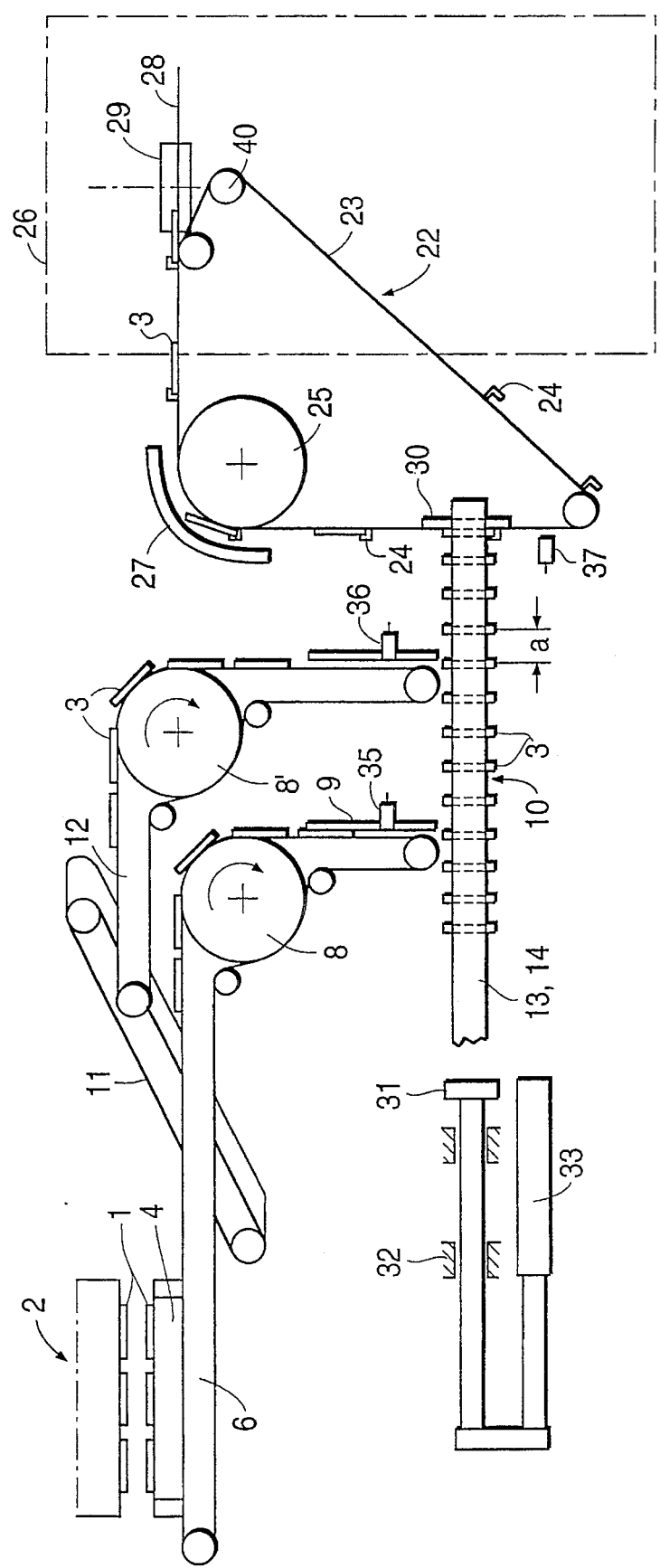
FIG. 1 is a schematic side elevational view of a preferred embodiment of the invention.
Figure 2:
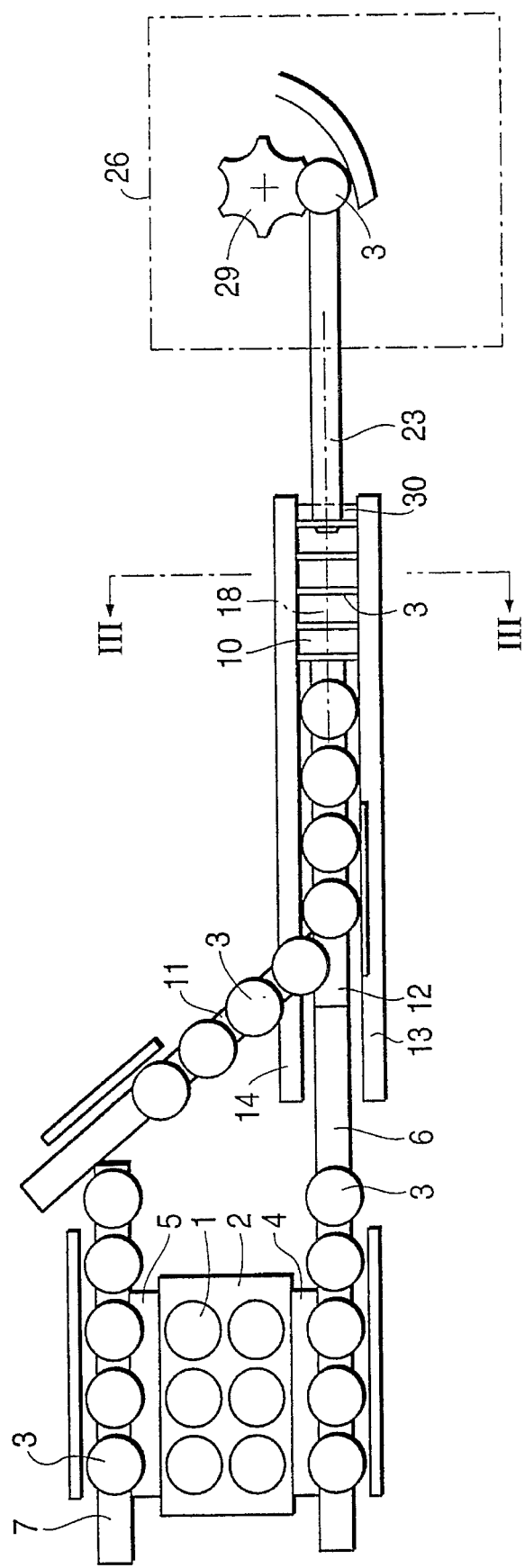
FIG. 2 is a schematic top plan view of the construction shown in FIG. 1.

Turning to FIGS. 1 and 2, the lids 3 stamped out with tools 1 of a press 2 are transferred after each press stroke on metal sheet slides 4, 5 onto outgoing conveyor belts 6, 7 of different lengths. Underneath the upper runs of the conveyors 6 and 7, magnets are disposed in a conventional manner to ensure that the lids are securely guided.

The longer conveyor belt 6 is deflected downwardly to a storage track 10 by means of deflecting wheel 8. From the shorter conveyor belt 7 the lids advanced thereon are transferred by means of an adjoining upwardly sloping intermediate belt 11 to a deflecting belt 12 which, in turn, adjoins the intermediate belt 11 and which, by means of a deflecting roller 8' is deflected downwardly towards the storage track 10. Additional guides 9 for the lids 3 may be provided parallel to the vertically downwardly oriented parts of the belts 6 and 7.

Figure 3:
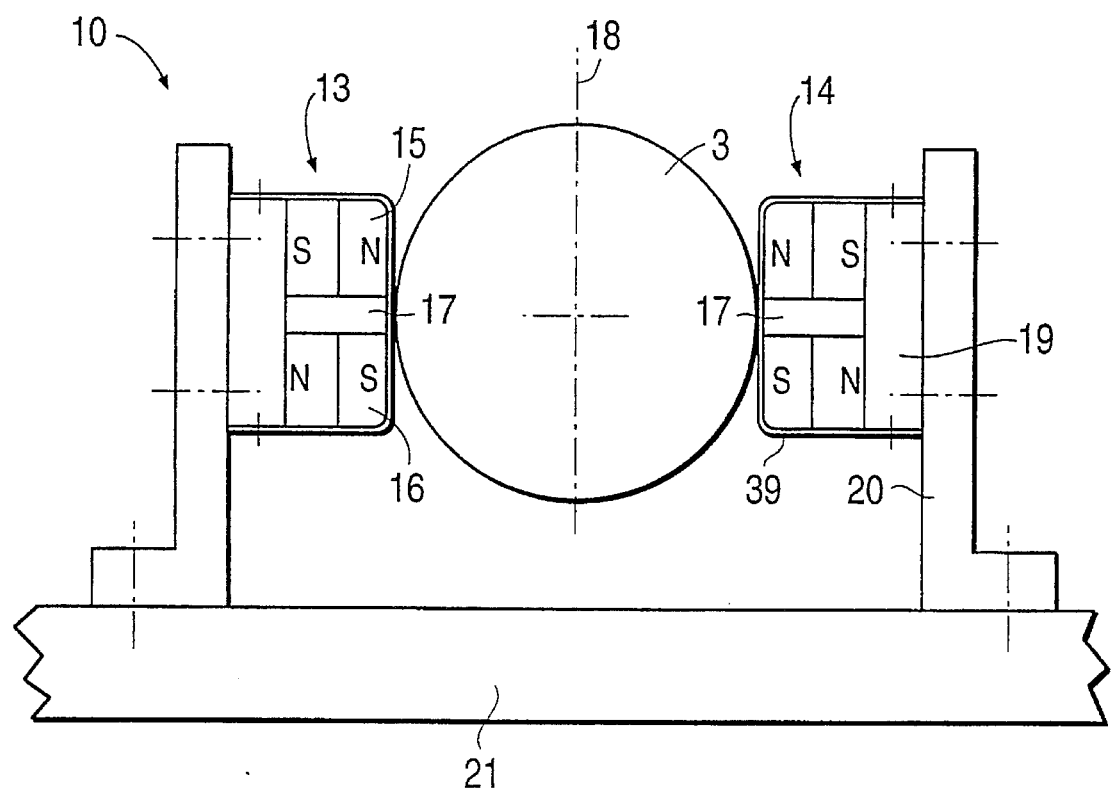
FIG. 3 is an enlarged schematic sectional view taken along line III—III of FIG. 2.

Also referring to FIG. 3, the storage track 10 has two laterally arranged, substantially horizontally extending magnet assemblies 13, 14 whose clearance from one another essentially corresponds to the lid diameter, including an appropriate play to ensure an unimpeded longitudinal advance of the lids. Each magnet assembly 13, 14 has two superposed dual rows 15, 16 of permanent magnets which are separated from one another by a strip 17 made of antimagnetic material. The magnet rows 15, 16 and the strips 17 at each side of the storage track 10 are secured to flat bars 19 made of magnetizable material which, in turn, are supported by holders 20 at a base frame 21.

The magnets of the upper rows 15 are oriented with their north pole towards the longitudinal vertical central plane 18 of the storage track 10, whereas the lower rows 16 are oriented to the plane 18 with their south pole. Viewed across the plane 18, the magnets are arranged in a mirror image concerning their polarity. The bar 19 serves as a yoke plate for the magnet rows 15, 16 so that an overall U-shaped elongated magnet system is obtained on either side of the storage track 10, where the legs of the "U" are formed by the upper and lower rows 15, 16 and the base of the "U" is formed by the yoke plate 19.

At that end of the storage track 10 which adjoins the automatic flanging apparatus 26, a removal conveyor 22 is provided which includes a circulating strap-like belt 23 on which hook-like carrier members 24 are secured. The belt 23 is guided between the magnet assemblies 13, 14 vertically upwardly and is, above the storage track 10, deflected by a deflecting wheel 25 and introduced, for example, into an automatic flanging apparatus 26. To ensure that the lids 3 are securely guided during belt deflection, external guides 27 are mounted about the deflecting wheel 25.

In the automatic flanging apparatus 26 a guide or support surface 28 and an intake star 29 for receiving the lids are provided.

Also referring to FIGS. 4 and 5, at that end of the storage track 10 which adjoins the automatic flanging apparatus 26 a fixed abutment 30 is provided which is formed of two lateral bars 30a, 30b oriented parallel to the belt 23.

At that end of the storage track 10 which is remote from the automatic flanging machine 26 an abutment 31 is provided between the magnet assemblies 13, 14. The abutment 31 has a rotationally symmetrical shape adapted to the shape of the lids 3. For varying the effective length of the storage track 10, the abutment 31 is supported displaceably within the storage track 10 in guides 32 and may be adjusted by means of a linear drive 33.

The lids 3 situated between the magnet assemblies 13, 14 are attracted by the two assemblies by equal forces and thus the lids are in suspension between the two magnet assemblies. The lids 3 in suspension are all of identical polarity and thus repel one another. In this manner, they assume a distance from one another which is obtained from the available length of the storage track 10 and the number of lids dwelling therein. The lids which drop from the conveyor belt 6 and the deflecting belt 12 into the storage track 10 are inserted automatically by the prevailing magnetic forces. During such an occurrence the mutual distance of the lids is accordingly reduced as an additional lid is entering the storage track 10. Such a minimum clearance between lids is needed, for example, for carrying away or receiving the lids by the hooks 24 mounted on the removal conveyor belt 23 in order to ensure that in each instance only a single lid will be pulled off.

To be able to maintain the operationally most favorable smallest axial lid distance a shown in FIGS. 4 and 5, the length of the storage track 10 may be varied by displacing the movable abutment 31 by means of the linear drive 33 as the number of lids increases in the storage track 10. For this purpose, along the vertical branches of the removal conveyor belt 6 and the deflecting belt 12 pulse counters 35, 36 are arranged which respond to each lid 3 as it drops into the storage track 10. The pulse counters may be switches or optical barriers. To respond to the lids removed from the downstream end of the storage track 10, a further pulse counter 37 is arranged in such a manner that it responds as each hook 24 of the removal conveyor 22 passes by. In the alternative, the removed lids may be sensed by a counter directly in the zone of the removal conveyor belt 12. From the number of pulses of the counters 35, 36 and 37 associated with the number of lids present in the storage track 10 at the beginning of pulse counting, the actual momentary lid number in the storage track 10 may be obtained.

Instead of determining the number of lids in the storage track 10 and to calculate the distance between the lids while considering the actual length of the storage track 10, in the alternative the distance between the lids may also be ascertained by means of a sensor 38 which determines the position of the momentarily next-to-the-last lid.

In order to ensure an unimpeded follow-up advance of the lids in the storage track 10, the magnets of the rows 15, 16 are surrounded with a smooth metal cover sheet 39 made of antimagnetic stainless steel.

To ensure an accurate transfer of the lids to the inlet star 29 of the automatic flanging machine 26, the drive of the removal conveyor 22 is connected, for example, at the deflecting wheel 40, with the drive of the inlet star 29 by means of a gearing.

Instead of guiding all the lids 3 obtained from the press 2 in a single storage track 10, the removal conveyor belts 6 and 7 may be associated with separate, own storage tracks leading to the automatic flanging machine 26.

It will be understood that the above description of the present invention is susceptible to various modifications, changes and adaptations, and the same are intended to be comprehended within the meaning and range of equivalents of the appended claims.

What is claimed is:

1. An apparatus for receiving ferromagnetic container lids from a first processing unit and for advancing the lids to a second processing unit, comprising
   (a) a storage track having a length dimension and opposite first and second ends; said storage track including
      (1) first and second magnet assemblies extending parallel to said length dimension in a substantially horizontal orientation; said first and second magnet assemblies having a clearance corresponding to an expected outer diameter of the lids for accommodating the lids in said clearance in an orientation in which said outer diameter of the lids is perpendicular to said length dimension; said lids being adapted to be suspended in said clearance by magnetic forces generated by said first and second magnet assemblies and acting on the lids;
      (2) a first abutment situated in said clearance at said first end of said storage track for abutting an outermost lid of a lid series suspended in said clearance; and
      (3) a second abutment situated in said clearance at said second end of said storage track for abutting an outermost lid of the lid series;
   (b) a supply conveyor extending to said storage track for advancing the lids to said storage track and introducing the lids in a vertical direction into said storage track; and
   (c) a removal conveyor extending from said storage track for removing a lid therefrom; the lids in suspension in said clearance assume a spaced relationship relative to one another by mutual repulsion.

2. The apparatus as defined in claim 1, wherein each of said first and second magnet assemblies is formed of a U-shaped magnet unit being open toward a longitudinal vertical central plane of said clearance.

3. The apparatus as defined in claim 2, wherein each said U-shaped magnet unit includes
   (a) a series of first magnets extending parallel to said length dimension and forming a first leg of the U-shaped magnet unit;
   (b) a series of second magnets extending underneath said series of first magnets parallel thereto and forming a second leg of the U-shaped magnet unit; magnets of the first magnet assembly in alignment with magnets of the second magnet assembly having polarities in a mirror-image arrangement and magnets in vertical alignment within said first and second magnet assemblies having opposite polarities;
   (c) an antimagnetic strip separating said series from one another; and
   (d) a yoke plate connecting the series to one another and forming a base of the U-shaped magnet unit.

4. The apparatus as defined in claim 3, wherein each of said first and second magnets is formed of two magnet pieces arranged in a horizontal series perpendicularly to said length dimension; whereby each series of first and second magnets is formed of a double row of magnets.

5. The apparatus as defined in claim 2, wherein each magnet unit has a side oriented toward said longitudinal vertical center plane; further comprising an antimagnetic metal sheet of low-friction surface covering each said side; said clearance being measured between facing surfaces of the metal sheets covering said first and second magnet assemblies, respectively.

6. The apparatus as defined in claim 1, wherein said second abutment is fixedly supported.

7. The apparatus as defined in claim 1, further comprising supporting means for adjustably supporting said first abutment for displacements in a direction parallel to said length dimension to vary an effective length of said storage track.

8. The apparatus as defined in claim 7, wherein said supporting means comprises a linear drive means for displacing said first abutment.

9. The apparatus as defined in claim 8, further comprising control means for controlling said linear drive as a function of a momentary quantity of lids present in said storage track.

10. The apparatus as defined in claim 9, wherein said control means includes lid counting means for counting the lids entering and leaving said storage track.

11. The apparatus as defined in claim 9, wherein said control means includes sensor means for determining a position of a next-to-the-last lid from said second abutment.

12. The apparatus as defined in claim 1, wherein said supply conveyor is a first supply conveyor; further comprising a second supply conveyor extending to said storage track for advancing the lids to said storage track and introducing the lids in a vertical direction into said storage track.

13. The apparatus as defined in claim 12, wherein said second supply conveyor is composed of a plurality of adjoining conveyor belts.

* * * * *